Aug. 5, 1941.  G. E. WHITE  2,251,537
ELECTRICAL TRANSIENT PROSPECTING
Filed Dec. 16, 1937
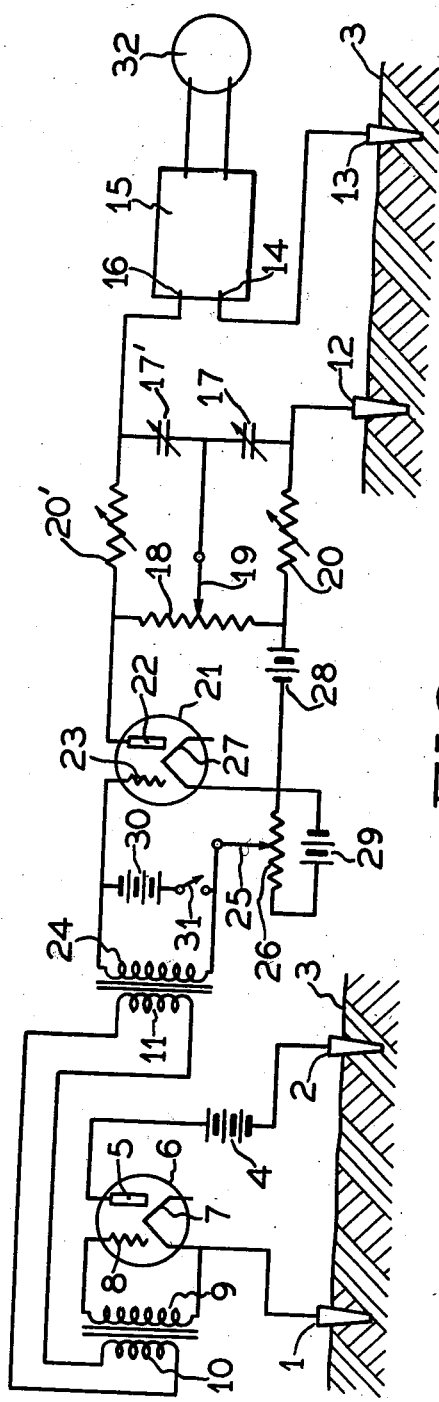
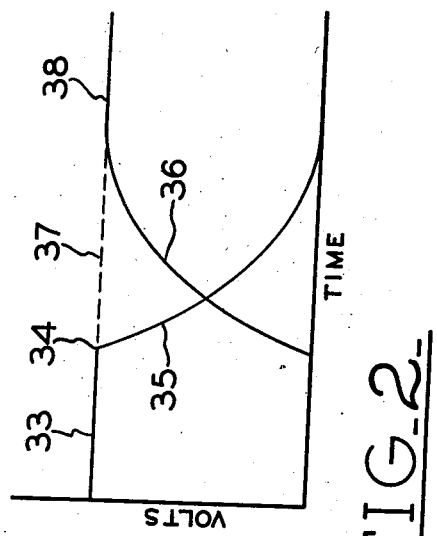
INVENTOR.
Gifford E. White
BY
J. C. Small
ATTORNEY.

Patented Aug. 5, 1941

2,251,537

UNITED STATES PATENT OFFICE 2,251,537

ELECTRICAL TRANSIENT PROSPECTING

Gifford E. White, Fredericksburg, Tex., assignor to Standard Oil Development Company, a corporation of Delaware Application December 16, 1937, Serial No. 180,091

14 Claims. (Cl. 175—182)

The present invention is directed to a method and apparatus for use in geophysical prospecting in which earth current transients are studied with a view to detecting anomalies in substructure.

In the prospecting method known as the transient method a voltage is suddenly applied across a pair of electrically connected electrodes spaced from each other on the earth's surface, and the rate of change of voltage between another pair of electrically connected electrodes spaced from each other and from the first pair of electrodes on the earth's surface is observed. A transient of a current, or a voltage, is the changes in value that either undergoes in passing from one steady state to another steady state, whether it be from a lower to a higher steady state or vice versa. For example, when a voltage is applied to the charging electrodes and held there for a period of time and then withdrawn, the difference of potential between the probe electrodes passes from zero through a series of values which depend upon the nature of the substructure between the probe electrodes to a constant or steady state value and then decays, in the same way it built up, to zero. A curved representing this change in potential would form an area, two sides of which would be defined by the transients and the other two sides of which would be defined by straight lines indicating maximum and minimum steady states. The area under this curve can be indicated by suitable instruments such as a ballistic galvanometer.

Due to the limitations of recording instruments, it was found difficult accurately to record small changes in transients from one area to another by the use of a single pair of probe electrodes with a single recording instrument. In order to overcome this difficulty it has already been proposed to use two pairs of charging electrodes, which may be made up of three electrodes with one electrode common to each pair, and to oppose the transients arriving at the probe electrodes in such a way as to record only the difference between them. As a further development of this procedure, one probe electrode was maintained in fixed position and the distance between the other probe electrode and the nearest charging electrode adjusted until the transients arriving at the respective probe electrodes were equal and cancelled each other. The significant data then became the distances between the probe electrode which was adjusted and the charging electrode. This procedure, however, requires the services of a number of men and the use of a large amount of electrical cable.

According to the present invention, transient prospecting is carried out by using a pair of charging electrodes and a pair of probe electrodes and associating with the circuit connecting the probe electrodes an electrical network having adjustable constants such that when a given direct current voltage is applied to the charging electrodes and a direct current voltage of the same value as the steady state voltage ultimately established between the probe electrodes is applied to the network associated with the probe electrodes, a transient, identical with the transient received by the probe electrodes, may be built up in the electrical circuit by suitable adjustment of its constants and opposed to the earth transient in the recording instrument. With this arrangement, it is possible to reduce transient prospecting to a one-man job. In addition, the significant data become the values of the constants in the electrical network from which it is possible, if desired, to write the mathematical equation for the earth transient.

Briefly, the electrical network consists of a combination of resistances and capacities and/or inductances which by suitable manipulation may cause the current resulting from a D. C. voltage to build up gradually and to decay gradually as desired. The method may be carried out by maintaining a constant voltage in the electrical network and withdrawing the voltage from this network at the same time the voltage is applied to the charging electrodes whereby, with suitable adjustment of the constants of the network, the transient of the network will decay at the same rate that the earth transient is building up with the result that with the network voltage and the probe electrode voltage applied with the same polarity to the same indicating instrument, the latter will reflect no change of voltage. Alternatively, the voltage may be applied to the electrical network at the same time it is applied to the charging electrodes, in which case, with suitable adjustment of the constants of the network, the transient of the network will build up at the same rate as the earth transient with the result that with the network voltage opposed to the probe electrode voltage the recording instrument will reflect no current.

The nature and objects of the present invention will be better understood from the following detailed description of the accompanying drawing in which, Figure 1 is a schematic view of one arrangement which may be used to practice the invention; and Figure 2 is a graphical illustration of the effect of the network transient on the earth transient in one embodiment of the present invention.

Referring to Figure 1 charging electrodes 1 and 2 are shown spaced in the ground 3. Electrode 2 is connected to the negative terminal of battery 4 the positive terminal of which is connected to plate 5 of a Thyratron 6, the filament 7 of which is connected to electrode 1 and to the grid 8 through the secondary 9 of a transformer, the primary 10 of which is connected to the primary 11 of a second transformer.

Probe electrodes 12 and 13 are also spaced in the ground preferably in alignment with electrodes 1 and 2. Electrode 13 is connected to terminal 14 of amplifier 15. Electrode 12 is connected to the other terminal 16 of amplifier 15 through a pair of variable condensers 17 and 17'. Connected in parallel with condensers 17 and 17' is a rheostat 18 having a dividing arm 19 connected to the conductor between the condensers. Between rheostat 18 and condenser 17 is a variable resistance 20. Between rheostat 18 and condenser 17' is a variable resistance 20'. Rheostat 18 is connected across the output of a tube 21 having a plate 22 connected in series with terminal 16 through variable resistance 20'. The grid 23 of the tube is connected with one terminal of secondary 24 of the transformer of which 11 is the primary. The other terminal of secondary 24 is connected to pointer 25 of rheostat 26 which is in series with filament 27 and with electrode 12 in a line which includes B battery 28 and C battery 29. Connected across secondary 24 is a battery 30, the negative side of which is connected to grid 23 and the positive terminal of which is connected to pointer 25. Arranged adjacent battery 30 is a hand switch 31.

An oscillograph 32 is connected across the output of amplifier 15.

The arrangement shown may be operated in two ways. If 6 is the type of tube in which a plate current is caused to flow by impressing a voltage on grid 8, tube 21 can be either the same type of tube or can be a type in which the impression of a voltage on grid 23 interrupts the plate current. When tube 22 is the latter type a plate current is flowing when switch 31 is open. At the same time no plate current is flowing in tube 6. When switch 31 is closed a voltage is impressed on grids 23 and 8. This interrupts the plate current in tube 21 and initiates the plate current in tube 6 thereby impressing a voltage across charging electrodes 1 and 2. When the plate current in tube 21 is interrupted condenser 17, which has been charged, discharges through the lower part of rheostat 18 and the variable resistance 20, and condenser 17', which has been charged, discharges through the resistance 20' and the upper part of rheostat 18. As a result, a changing voltage of the same polarity as the changing voltage impressed across the terminals of amplifier 15 by the probe electrodes is impressed across these terminals by condensers 17 and 17'.

The resultant of these changing voltages is reflected by the oscillograph as shown in Figure 2 in which voltage is plotted as the ordinate and time is plotted as the abscissa.

The voltage resulting from the plate current in tube 21 is indicated by line 33. Point 34 indicates the time at which switch 31 is closed. The current in the electrical network then begins to decay at a rate depending on the constants of the electrical network and at the same time the potential difference between the probe electrodes resulting from the earth transient begins to build up at a rate depending on the constants of the earth. Line 35 indicates the rate of decay of the network voltage and line 36 indicates the rate of building up of the voltage from the earth transient. When the network constants are properly adjusted these two lines will have the same $$\frac{dV}{dT}$$

but in opposite directions. This means that the oscillograph will continue to reflect a voltage, indicated by dotted line 37, until the voltage resulting from the earth transient reaches the same value indicated by line 38.

It is, of course, apparent that it would only be a rare coincidence that the constants in the electrical network would be such that the transients in the network would match the earth transient the first time switch 31 is closed. In practice switch 31 is closed and the deviation of the voltage recorded by the oscillograph from a constant value is noted. This deviation makes plain to the operator what adjustments need be made in the resistances and the reactances of the network. In view of the fact that a transient is of a duration which at a maximum is not more than $\frac{1}{10}$ of a second, the switch 31 need not be closed for more than a second or two. Consequently, in a relatively short period many adjustments of the constants of the electrical network can be made, if necessary, in order to match the earth transient.

When the above procedure is followed, the operator first balances the steady state voltage of the network against the steady state voltage of the probe electrode circuit. Before switch 31 is closed the oscillograph shows a straight line indicating the sweep voltage. When the switch is closed any difference between the steady state voltage of the network and that of the probe electrode circuit will cause a shifting of that line. So the operator adjusts the grid bias of tube 21 by moving pointer 25 on rheostat 26 until the closing of switch 31 causes no shift in the sweep voltage, i. e. until the steady states above referred to are balanced.

The earth transient causes a break in the sweep voltage line. When the network transient is the same as the earth transient they cancel each other, thereby eliminating the break. So, after balancing the steady state voltages as described above, the operator adjusts resistances 20 and 20' and/or condensers 17 and 17', and/or changes the position of pointer 19 on rheostat 18 until no break appears on the sweep voltage line.

If, on the other hand, tube 21 is of the same type as tube 6 the closing of switch 31 initiates a plate current in each tube. The building up of a voltage across condensers 17 and 17' will depend upon the capacity of the condensers and the resistances in the network which can be so adjusted that this voltage will build up at the same rate as the voltage across the probe electrodes resulting from the earth transients. In this case the oscillograph should reflect no voltage when the probe electrodes and the balancing network are connected to it with opposite polarity, and any voltage recorded is an indication that the constants of the electrical circuit require further adjustment.

Various changes can be made in the arrangement shown without departing from the scope of the present invention. In the arrangement shown, two variable condensers 17 are provided. The voltage in a condenser, in building up or decaying, follows a time voltage curve of exponential form which will vary with each individual condenser. By using two condensers as shown, any desired combination of the two exponentials can be produced by varying the position of pointer 19 on rheostat 18 which in this case acts as a proportioning means. It is evident that for greater flexibility of the balancing network additional variable condensers can be added to the circuit in the manner shown.

A simplified form of balancing network has been described above. In using such a network for the reproduction or balancing of a complex transient, such as shown in Figure 3 of Patent #1,911,137, issued May 23, 1933, to Blau, the transient is broken up into sections, each hump being a section. Each hump is then reproduced by adjustment of the constants in the dummy network so that for a complete matching of the transients four adjustments of the dummy network are necessary.

It will be understood, of course, that a dummy network can be devised that will reproduce any transient no matter how complex. Such a network would, however, be very complicated in many instances for which reason it is preferred to use the simplified network and match complicated transients in the manner above described.

As previously pointed out, the balancing network described above is also useful in electrical prospecting in which quantities of electricity transmitted from charging electrodes to probe electrodes are measured, as with a ballistic galvanometer. In this type of measuring, two transients are involved, the build up and the decay. With the balancing network opposed to the probe electrodes across a ballistic galvanometer the quantity of electricity received at the probe electrodes can be cancelled by suitable adjustment of constants of the balancing network, it being understood that the balancing network and the charging electrodes will be placed under such a voltage that the maximum value of the voltage across the terminals of the galvanometer, as received from the probe electrodes, will be the same as that received from the balancing network. Thus in carrying out this procedure the operator first connects the probe electrodes and the balancing network separately to the galvanometer to make sure all connections are correct and then connects them in opposition to the galvanometer and observes the resultant. The operator can decide from the value of the resultant what adjustments should be made in the balancing network to bring the resultant to zero.

The nature and objects of the present invention having been thus described and illustrated, what is claimed as new and useful and is desired to be secured by Letters Patent is:

1. The method of determining underground structure which comprises instituting a difference in direct current voltage between spaced points in the ground, whereby a transient is initiated in the earth, instituting a change in the direct current voltage across an electrical network having adjustable constants whereby a transient is initiated in said network, receiving both transients and adjusting the constants of said electrical network until its transient corresponds, at least in part, to the earth transient.

2. The method of determining underground structure which comprises applying a direct current voltage to the ground across spaced points, whereby a transient is initiated in the earth, simultaneously applying a direct current voltage across an electrical network having adjustable constants whereby a transient is initiated in said network, receiving both transients, opposing said transients in a common recording device and adjusting the constants in the electrical network until its transient matches at least a portion of the earth transient.

3. The method of determining underground structure which comprises applying a direct current voltage to the ground across spaced points, whereby a transient is initiated in the earth, simultaneously applying a direct current voltage across an electrical network having adjustable constants whereby a transient is initiated in said network, recording an electrical quantity derivable from the earth circuit of which the earth transient is a component part, recording an electrical quantity derivable from the electrical network of which the network transient is a component part, comparing said quantities and adjusting the constants of said network until said quantities are equal.

4. The method of determining underground structure which comprises applying a direct current voltage to the ground across spaced points, whereby a transient is initiated in the earth, simultaneously applying a direct current voltage across an electrical network having adjustable constants whereby a transient is initiated in said network, receiving an electrical quantity derivable from the earth circuit of which the earth transient is a component part, receiving an electrical quantity derivable from the electrical network of which the network transient is a component part, simultaneously recording said quantities and adjusting the constants of the electrical network until said quantities are equal.

5. The method of determining underground structure which comprises applying a direct current voltage to the ground across spaced points, whereby a transient is initiated in the earth, simultaneously applying a direct current voltage across an electrical network having adjustable constants whereby a transient is initiated in said network, receiving an electrical quantity derivable from the earth circuit of which the earth transient is a component part, receiving an electrical quantity derivable from the electrical network of which the network transient is a component part, simultaneously recording said quantities, observing the difference between said quantities, adjusting the constants in the electrical network to eliminate this difference and repeating the cycle of operations to observe the effect of the adjustment.

6. The method of determining underground structure which comprises applying a direct current voltage across spaced points in the earth's surface, whereby a current transient is initiated in the area subject to the influence of said voltage, measuring said transient in a portion of said area by measuring the rate of change of potential difference between selected points in said portion, comparing the change of potential difference between said selected points with the rate of change of a changing D. C. voltage, the rate of change of which can be regulated, and regulating the rate of change of said last mentioned voltage until it matches the rate of change of potential between said selected points.

7. The method of determining underground structure which comprises arranging charging electrodes in the ground, arranging electrically connected probe electrodes in the ground, arranging an electrical network having variable reactance in the probe electrode circuit, simultaneously applying a direct current voltage to the charging electrodes and the electrical network and balancing the transient of the electrical network against the earth transient picked up by the probe electrodes.

8. The method of determining underground structure which comprises applying a direct current charging voltage to the ground across spaced points for a length of time sufficient for steady state conditions to obtain and then withdrawing said voltage, whereby a transient is initiated in the earth, receiving said transient at other spaced points, determining the steady state of the voltage difference at said other spaced points, applying a voltage of the same steady state value to an electrical network having an adjustable reactance whereby a transient is initiated in said network, simultaneously reapplying the aforesaid charging voltage whereby a second earth transient is instituted, simultaneously receiving said network transient and said second earth transient and opposing said transients in a single indicating instrument.

9. The method of determining underground structure which comprises applying a direct current voltage to an electrical network having an adjustable reactance whereby a transient voltage is set up in said network, determining the steady state value of the network voltage, applying a direct current charging voltage to a pair of electrodes spaced in the ground for a length of time sufficient for steady state conditions to obtain and then withdrawing said voltage, whereby a transient voltage is instituted in the ground, receiving said transient voltage, determining the steady state of the earth voltage, adjusting the steady state of the network voltage to the steady state of the earth voltage, then simultaneously withdrawing the voltage from the electrical network and reapplying the charging voltage to the electrodes whereby a decaying transient is initiated in the network and an increasing transient is initiated in the earth, receiving both transients and comparing them.

10. A method according to the preceding claim in which the decaying transient and increasing transient are opposed in the same indicating instrument, their resultant is observed and the sequence of operations is repeated with preliminary adjustment of the impedance of the network before each repetition until said resultant is zero.

11. An apparatus for geophysical prospecting comprising a pair of charging electrodes adapted to be spaced in the ground, an electrical circuit connecting said electrodes comprising a vacuum tube, a connection between the plate of said tube and one of said electrodes through a battery, a connection between the grid of said tube and the other electrode through a winding of a transformer, a pair of probe electrodes adapted to be spaced in the ground, an electrical circuit connecting said electrodes including an indicating instrument, a lead connecting one of said electrodes to said instruments, a lead connecting the other electrode to said instrument through a plurality of condensers arranged in cascade, a proportioning rheostat arranged across said condensers, a variable resistance in series with each of said condensers, a lead connecting one of said condensers to the plate of a vacuum tube, a lead connecting another of said condensers to the grid of the vacuum tube through a winding of a transformer, and leads connecting the remaining winding of the first mentioned transformer with the remaining winding of the second mentioned transformer.

12. The method of determining underground structure which comprises causing a current having a value varying from a minimum to a maximum to flow in the earth, continuously recording the values through which the difference in potential between two points subject to the influence of the earth current passes while said current changes from its minimum to its maximum, comparing the rate of change of said difference in potential to another changing potential whose rate of change can be varied as desired, and varying the rate of change of the last mentioned potential until it corresponds to that of said difference in earth potential.

13. An apparatus for geophysical prospecting comprising a pair of electrically connected charging electrodes adapted to be spaced in the ground, means for instituting a change in voltage across said electrodes, a pair of electrically connected probe electrodes adapted to be spaced in the ground, an indicating instrument in the probe circuit, an electrical network directly connected in said probe electrode circuit comprising an adjustable reactance and an adjustable resistance, means in said electrical network independent of the voltage changing means in the charging circuit for instituting a change in voltage in said electrical network in addition to any voltage change picked up by the probe electrodes, and means for causing the voltage changing means in the electrical network and in the charging electrode circuit to act simultaneously.

14. An apparatus for geophysical prospecting comprising a pair of electrically connected charging electrodes adapted to be spaced in the ground and constituting a charging circuit, means in said circuit for changing the voltage across said electrodes, a pair of electrically connected probe electrodes adapted to be spaced in the ground, an indicating instrument in the probe electrode circuit, an electrical network in said probe circuit comprising an adjustable reactance and an adjustable resistance, means in said electrical network for instituting therein a change in voltage independent of that picked up by the probe electrodes, an inductive coupling between the voltage creating means in the charging circuit and the voltage creating means in said electrical network, and means associated with said inductive coupling for initiating a change in voltage in the charging circuit and in said electrical network at the same instant.

GIFFORD E. WHITE.